United States Patent [19]

Matheson et al.

[11] Patent Number: 4,753,266
[45] Date of Patent: Jun. 28, 1988

[54] VALVE ASSEMBLY

[75] Inventors: Charles L. Matheson; Steven F. Robbins, both of Cookeville, Tenn.; John R. Smith, Leland, Iowa

[73] Assignee: Cummins Engine Company, Inc., Columbus, Ind.

[21] Appl. No.: 849,373

[22] Filed: Apr. 8, 1986

[51] Int. Cl.⁴ .................. F16K 37/00; F16K 24/02
[52] U.S. Cl. ............................. 137/558; 137/588; 116/109; 340/620
[58] Field of Search .......... 137/558, 588, 212, 625.46, 137/625.15; 340/620; 251/160, 164, 287, 314, 316; 222/481.5, 484; 116/109

[56] References Cited

U.S. PATENT DOCUMENTS

| | | | |
|---|---|---|---|
| 2,054,488 | 9/1936 | Sinks | 137/588 X |
| 2,810,398 | 10/1957 | Carlson | 137/588 |
| 2,878,829 | 3/1959 | Folmsbee | 137/588 |
| 3,422,848 | 1/1969 | Liebman et al. | 137/625.15 |
| 3,727,638 | 4/1973 | Zaremba, Jr. et al. | 137/572 |
| 3,822,716 | 7/1974 | Martin et al. | 137/212 |
| 3,834,412 | 9/1974 | Fannin | 137/588 X |
| 3,923,203 | 12/1975 | Anderson, Jr. | 137/588 X |
| 4,025,048 | 5/1977 | Tibbitts | 137/572 X |
| 4,109,829 | 8/1978 | Kuckens et al. | 137/588 X |
| 4,440,193 | 4/1984 | Matheson | 137/588 X |
| 4,611,627 | 9/1986 | Eidsvoog et al. | 137/588 |

FOREIGN PATENT DOCUMENTS 503385  5/1954  Canada .................. 137/588

Primary Examiner—Alan Cohan
Assistant Examiner—John Rivell
Attorney, Agent, or Firm—Neuman, Williams, Anderson & Olson

[57] ABSTRACT

A valve assembly is provided for controlling the flow of liquid accumulated in a closed vessel through a drain port in the bottom wall of the vessel. The assembly includes a body member having a first section disposed within the drain port. The body member has a second section extending outwardly from the first section. The first and second sections are provided with a first passage for air venting the vessel interior, a second passage for controlled draining of the accumulated liquid from the vessel interior, and a common opening, the latter having an exposed end. Adjustably mounted on the body member is a valve member having a first segment adjustably disposed with respect to the opening of the body member and a second segment projecting outwardly from the first segment and subtending the body member second section. The valve member second segment is provided with first and second passages corresponding with the first and second passages of the body member. Seal elements are provided on the body member second section and in encompassing relation with ends of the first and second passages formed in the body member. When the valve member is in one position of adjustment, the corresponding first and second passages communicate with one another thereby effecting drainage of the accumulated liquid. When in a second position of adjustment, at least the corresponding first passages are not in communication whereby no drainage occurs.

11 Claims, 3 Drawing Sheets

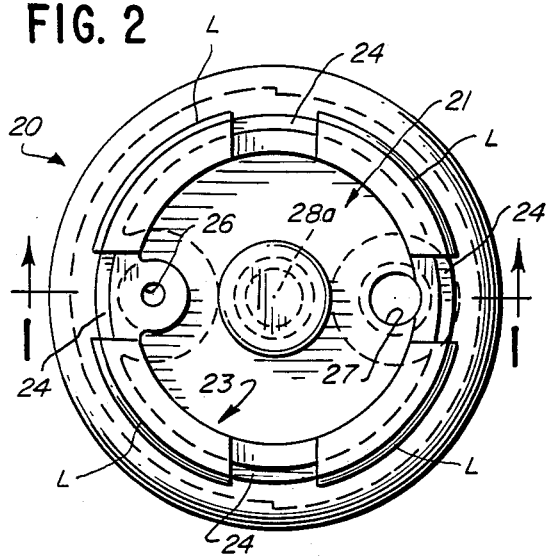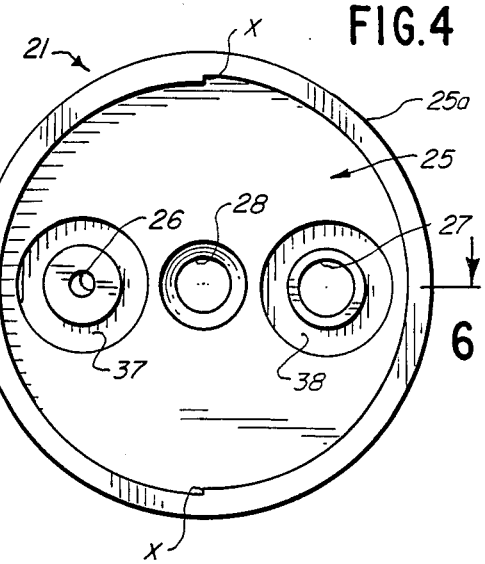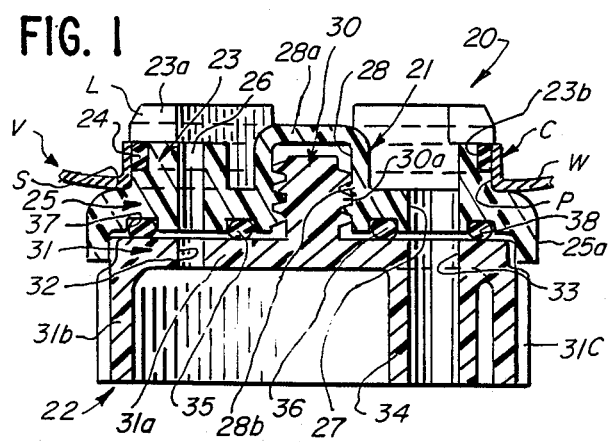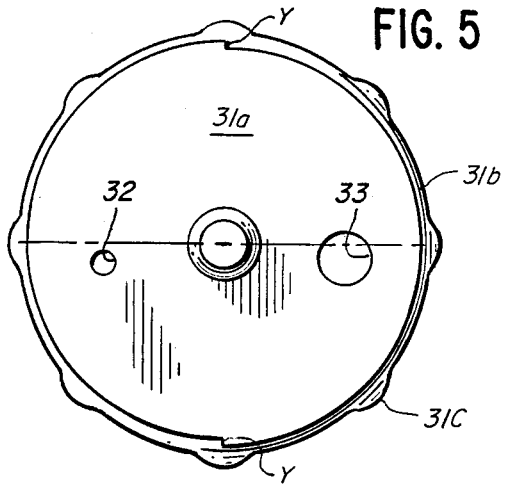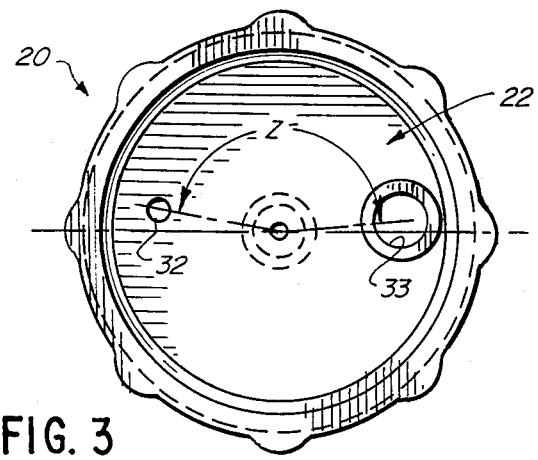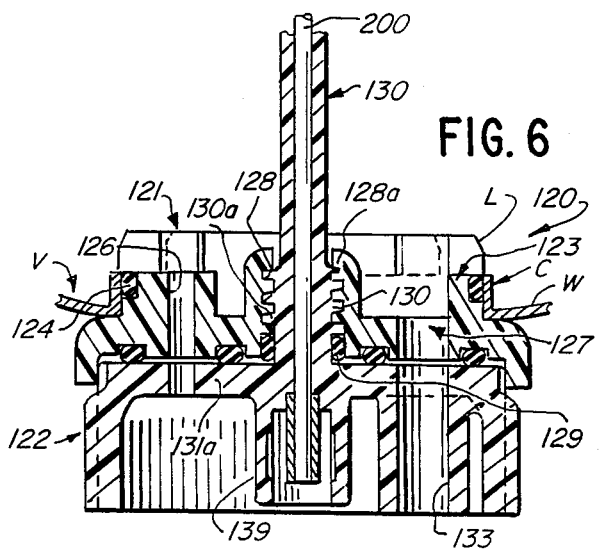

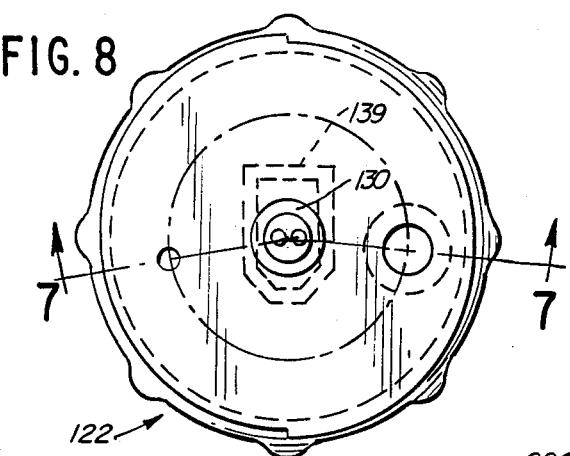
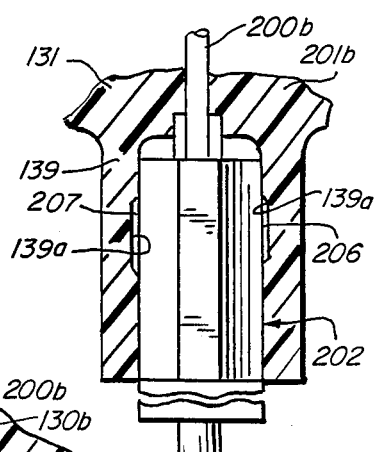
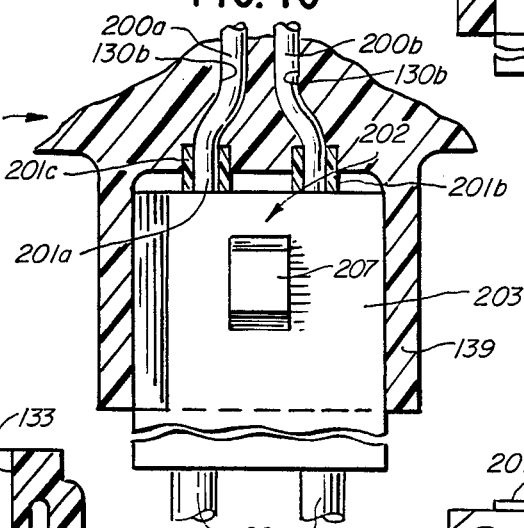
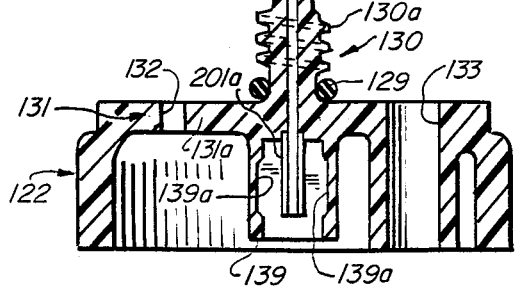
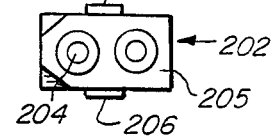
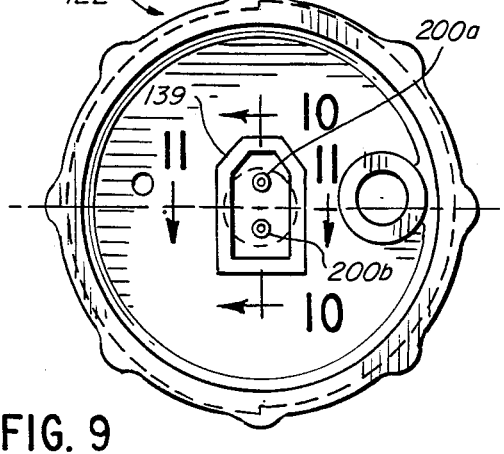
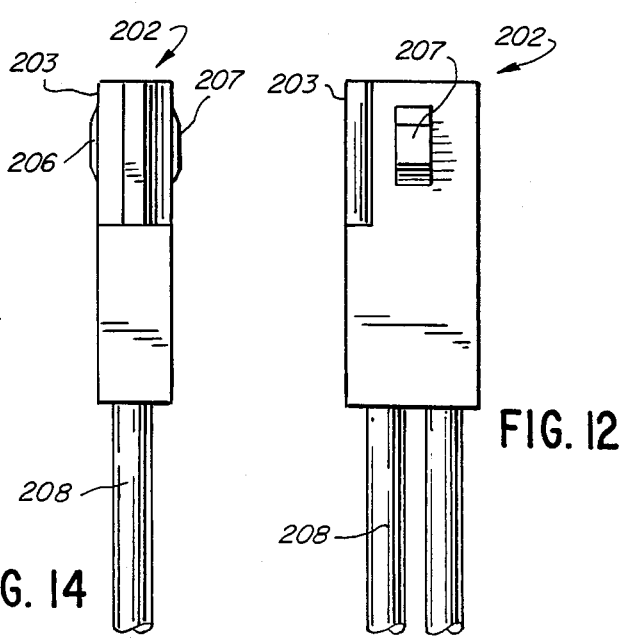

FIG. 15a
FIG. 15b
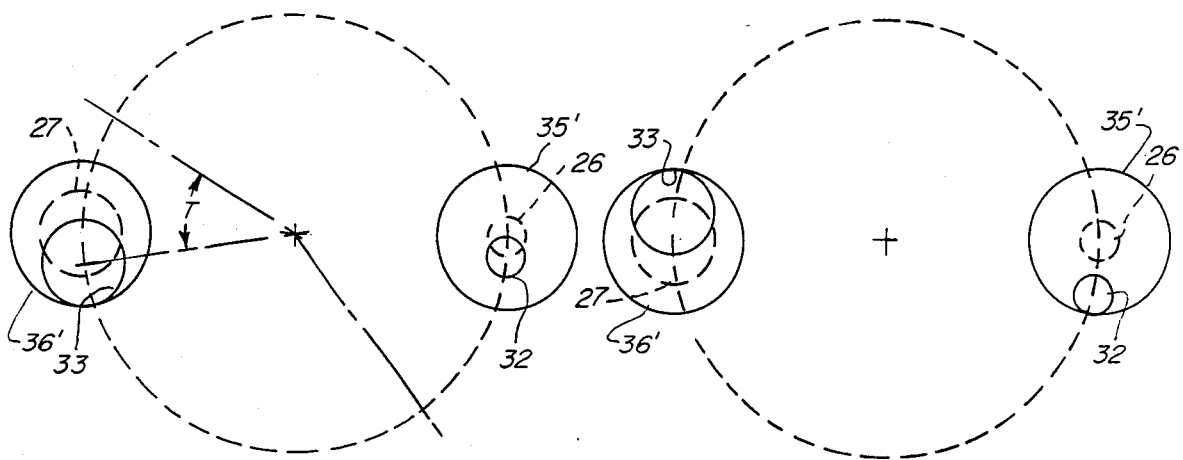
FIG. 16a
FIG. 16b
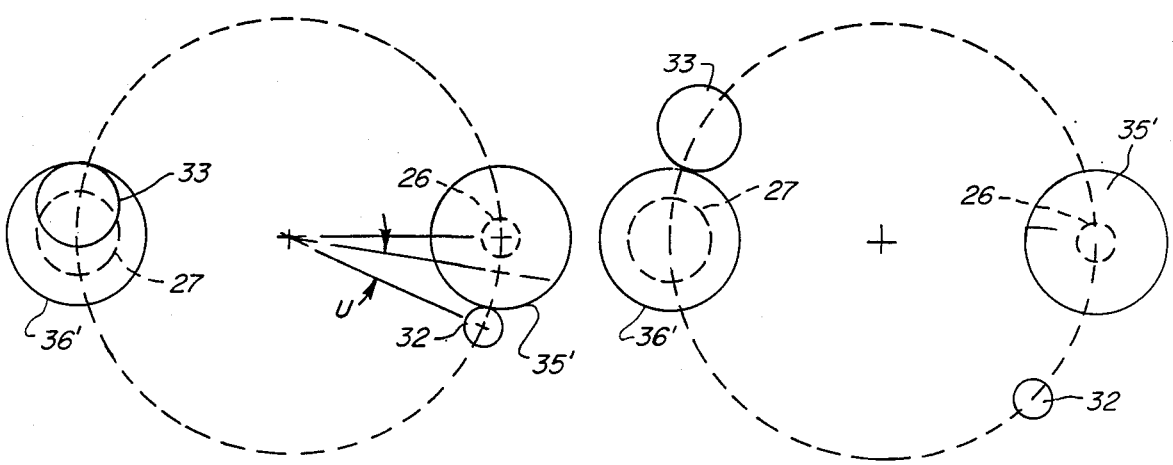

VALVE ASSEMBLY

BACKGROUND OF THE INVENTION

The use of valve assemblies in filters is wide spread particularly in heavy duty diesel engines and the like. The valve assembly permits the liquid (e.g., water) which has accumulated in the lower portion of the filter housing or vessel to be periodically drained. Such prior valve assemblies for this purpose, however, because of their design characteristics are beset with one or more of the following shortcomings: (a) the assembly is of a complex and costly construction; (b) the assembly is possessed of an inordinate number of components thereby making the assembly difficult and awkward to install on the filter vessel; (c) substantial manual manipulation of one of the components is required in order to effect drainage or to discontinue drainage through the valve assembly; and (d) the prior structure is provided with a liquid level sensor which is a separate entity and is not integrated with a functional component of the valve assembly.

SUMMARY OF THE INVENTION

Thus, it is an object of the invention to provide one improved valve assembly which overcomes the afore-noted shortcomings of prior assemblies of this general type.

It is a further object to provide an improved valve assembly having a minimum number of components which may be pre-assembled before the assembly is installed on the filter vessel.

It is a further object to provide an improved valve assembly which may be snap-fit into a sealing, locking engagement with a drain port formed in the bottom wall of the filter vessel.

It is a still further object to provide an improved valve assembly wherein a valve member cannot be removed from a body member once they are in assembled relation.

It is a still further object to provide an improved valve assembly wherein a flexible hose section can be readily connected to a portion of the assembly thereby controlling the flow direction of the liquid drained from the filter vessel.

It is another object to provide an improved valve assembly wherein a simple, yet accurate, level sensor can readily be incorporated therein.

Further and additional objects will appear from the description, accompanying drawing and appended claims.

In accordance with one embodiment of the invention, an improved valve assembly is provided for use on a filter unit for diesel engines or the like. The filter unit includes a closed vessel in which is located a filter device. The bottom wall of the vessel is provided with a drain port which is delimited by an upwardly extending collar. The improved valve assembly includes a body member having a first section which is disposed within the drain port and is in locking, sealing engagement with the drain port collar. The body member is also provided with a second section which extends outwardly from the lower end of the first section. The first and second sections have formed therein common first and second passages and a central opening. The first passage is for air venting the interior of the filter vessel. The second passage allows for controlled drainage of the liquid accumulated in the vessel interior.

Adjustably mounted on the body member is a valve member having an upwardly extending first segment mounted within the central opening. Extending outwardly from the lower end of the first segment and in subtending relation with the body member second section is a second segment. The second segment is provided with first and second passages. When the valve member is in a first predetermined position of adjustment relative to the body member the first passages of the body and valve members are in communication and the second passages of said members are in communication wherein controlled drainage of the accumulated liquid through the second passages occurs. When the valve member is in a second predetermined position of adjustment, the first passages of the body and valve member are not in communication with one another and no drainage of the liquid through the second passages occurs.

DESCRIPTION

For a more complete understanding of the invention, reference is made to the drawings wherein:

FIG. 1 is a fragmentary, vertical, sectional view taken along line 1—1 of FIG. 2 of one embodiment of the improved valve assembly shown mounted within the drain port of a closed vessel.

FIG. 2 is a fragmentary, top view of the valve assembly shown in FIG. 1.

FIG. 3 is a fragmentary, bottom view of the valve assembly shown in FIG. 1.

FIG. 4 is a bottom view of the body member per se of the valve assembly shown in FIG. 1.

FIG. 5 is a top view of the valve member per se of the valve assembly shown in FIG. 1.

FIG. 6 is similar to FIG. 1 but showing a second embodiment of the improved valve assembly.

FIG. 7 is an enlarged, vertical, sectional view of the valve member per se, including an O ring, of the valve assembly of FIG. 6 and taken along line 7—7 of FIG. 8.

FIG. 8 is a top view of the valve member of FIG. 7.

FIG. 9 is a bottom view of the valve member of FIG.7

FIG. 10 is an enlarged, fragmentary, sectional view taken along line 10—10 of FIG. 9.

FIG. 11 is a sectional view similar to FIG. 10, but taken along line 11—11 of FIG. 9.

FIG. 12 is an enlarged, side, elevational view of a connector adapted to be used with the sensor elements embodied in the valve member of FIG. 7

FIG. 13 is a top view of the connector of FIG. 12.

FIG. 14 is a left side, elevational view of the connector of FIG. 12.

FIG. 15a and b are schematic diagrams showing the relative positions of the first and second passages of the body and valve members of the valve assemblies of FIGS. 1 and 6, when the valve member is in two positions of relative adjustment whereby drainage of the accumulated liquid occurs through the communicating second passages.

FIG. 16a–b are similar to FIGS. 15a–b but showing the valve member in two positions of relative adjustment whereby there is no drainage of the accumulated liquid through the second passages.

Referring now to the drawings and more particularly to FIG. 1-3 one embodiment of the improved valve assembly 20 is shown for mounting within a drain port P provided in the bottom wall W of a closed vessel V. The vessel is a conventional design and of the type wherein a cylindrically shaped filter unit, not shown, may be housed. The vessel and filter unit are normally utilized with an internal combustion engine (e.g., diesel engine).

The drain port P, as seen in FIG. 1, is delimited by an upwardly extending collar C. The collar serves a dual purpose; namely, it reinforces the bottom wall circumjacent the port and it facilitates mounting of the valve assembly on the vessel, as will be explained more fully hereinafter.

Basically, the improved valve assembly includes a body member 21 and a valve member 22 which is mounted on the member 21 for limited rotation within a sector of not than 90°. Both members 21 and 22 are preferably molded of a suitable plastic material (e.g., MINLON 11C140). In some instances the body member may be molded as an integral part of the vessel bottom wall. Body member 21, as seen more clearly in FIGS. 1, 2 and 4 includes a first section 23 which is sized so as to slidably fit within the drain port P and the collar C delimiting same. The distal, or upper, end 23a of the first section is provided with a plurality of resilient, symmetrically arranged lock elements L which project upwardly beyond the collar and automatically spring outwardly so that the outer edges of the lock elements overlie and lockingly engage the upper edge of the collar, see FIG. 1. The outer wall surface of the first section is provided with a circumferential groove 23b in which is disposed an O-ring seal 24. The seal 24 is in sealing engagement with the interior surface of collar C.

Integral with and extending laterally from the lower portion of the first section is a second section 25 which is disposed on the exterior of vessel V. When the valve assembly 20 is mounted in place on the bottom wall of the vessel V, the second section 25 forms an annular shoulder S which engages the exterior of the vessel bottom wall W circumjacent the drain port P when the lock elements L are lockingly engaging the upper edge of collar C, see FIG. 1. The outer periphery of the body member second section 25 terminates in a depending flange 25a.

The first and second sections of the body member are provided with a first passage 26, a second passage 27, and a common central opening 28. The first and second passages 26,27 are preferably disposed in diametrically opposed relation, as seen more clearly in FIGS. 2 and 4. The passages are shown disposed at the same radial distance from the central opening; however, it is not essential that they be at the same radial distances. First passage 26 has a substantially smaller cross-sectional dimension than the second passage 27 and serves as an air vent for the interior of the vessel V. Passage 27 serves as a means of draining the liquid, not shown, which has accumulated at the bottom of the vessel.

The central opening 28 has the upper end thereof terminating within the first section 23 of the body member 21 of the assembly. In the illustrated embodiment, the upper end of opening 28 is closed by a solid portion 28a. In certain instances, however, the solid portion may be replaced by an inwardly extending annular collar like 128a, FIG. 6. Opening 28 is preferably provided with internal threads 28b. The upper end of the first passage 26 is substantially elevated relative to the upper end of the second passage 27.

Valve member 22 includes a centrally disposed upwardly extending first segment 30 provided with external threads 30a which mesh with the internal threads 28b of the central opening 28. The meshing threads allow minimal axial adjustment of the first segment relative to the opening 28 and also effect loading and unloading of the O-ring seals 35, 36 surrounding air vent passage 26 and drain passage 27. This action on the O-rings is important in order to compensate for any compression set occurring in the O-rings. Maximum upward relative movement of the first segment 30 is limited by the interference position between body member second section 25 and valve member base 31a when valve member 22 has been rotated during assembly approximately 2¼ turns after initial engagement of threads 28b and 30a so that passages 32, 33 formed therein assume a substantially 90° annular spaced relation with respect to passages 26, 27 of the body member. The downward relative movement of the first segment 30 is limited by pairs of complemental projecting stop lugs X and Y provided on the body and valve members, see FIGS. 4 and 5. The stop lugs of each pair in the illustrated embodiment are arranged in diametrically opposed relation, thus enabling the valve member 22 to be manually rotated relative to the body member a maximum of approximately 90° after the valve member has been assembled with the body member. The arrangement of the stop lugs X and Y can be varied from that shown so as to increase or decrease the maximum amount the valve member can be manually rotated. Normally, a rotation of approximately 45° is all that is required in order to attain the desired flow control, as will be described more fully hereinafter.

A second segment 31 of the valve member 22 is integral with the lower end portion of first segment 30 and includes a disc-shaped base 31a which extends laterally outwardly. The outer periphery of the base 31a terminates in a depending circumferential flange 31b. The flange functions as a knob so as to facilitate manual turning of the valve member 22 between predetermined open and closed positions. Outwardly projecting nubs 31c are formed on the exterior of the flange 31b to aid in gripping the valve member when turning same.

The stop lugs Y of the valve member are formed on the outer periphery of base 31a above the flange 31b. The outer periphery of base 31a is sized so as to fit within the depending flange 25a formed on the body member 21. The inner surface of flange 25a—that is the surface adjacent the outer periphery of the valve member base 31a—is provided with the stop lugs X.

Formed in base 31a are the first and second passages 32 and 33 which correspond to the respective passages 26 and 27 of the body member 21. Depending from base 31a and encompassing the lower end of passage 33 is a collar 34 which facilitates fitting thereto the end of a flexible hose or the like, not shown, to direct the flow of the drained liquid away from the valve assembly.

It will be noted in FIGS. 3 and 5 that the first and second passages 32 and 33 are annularly spaced Z from one another less than 180° (e.g., 165°), see FIG. 3. By reason of this relative positioning, minimum rotation of the valve member 22 is required to effect drainage or stopping of drainage through the valve assembly as will be discussed more fully hereinafter.

In order to prevent leakage between the body member 21 and the valve member 22 when drainage of the liquid is closed off, seals 35 and 36 (e.g., "O" rings) are placed between the underside of the second section 25 of the body member 21 and the upper surface of the base 31a of the valve member second segment 31, see FIG. 1.

Seal 35 is retained in a circular groove 37 which is formed in the underside of the second section 25 and is in encompassing relation with the lower end of the first passage 26. Seal 36 is retained in a second circular groove 38 formed in the underside of the second section 25. The groove 38 encircles the lower end of the second passage 27, see FIG. 4. Both seals are in a compressed state regardless of the relative rotational position of the valve member with respect to the body member, once the members have been initially assembled. It will be noted in FIG. 4 that both grooves 37 and 38 are radially spaced outwardly a substantial distance from the periphery of passages 26 and 27, respectively. The center lines of contact 35' and 36' of the respective O-ring seals 35 and 36 with the adjacent surfaces of the valve and body members are shown in the schematic diagrams in FIGS. 15a–b and 16a–b. In FIGS. 15a–b the valve member is shown in two positions of adjustment wherein drainage through the second passages 27 and 33 occurs because in both positions the first passages 26 and 32 are in communication and the second passages 27 and 33 are in communication causing the interior of the vessel V to be air vented, thus preventing a vacuum or a low pressure condition being created within the vessel interior. Any position of rotational adjustment of the valve member 22 between that shown in FIG. 15a and FIG. 15b will permit full drainage flow of the liquid from the vessel interior.

FIGS. 16a and 16b schematically show the valve member in two positions of rotational adjustment wherein in both instances the first passages 26 and 32 are not in communication with one another; thus, no liquid drainage will occur through the second passages 27 and 33, notwithstanding that in FIG. 16a the second passages 27 and 33 are in communication with one another.

FIG. 15a shows an angle T which indicates the minimum amount of clockwise turning required of the valve member to effect a change of position of passage 33 from the full drain position, FIG. 15a, to a fully closed position of both the first and second passages, FIG. 16b. In the illustrated embodiment, angle T is approximately 45°. When the valve member is in the position so that the passages are in the relation shown in FIG. 15a and in communication the stops X, Y are abutting one another.

FIG. 16a shows an angle U which indicates the minimum amount of clockwise turning required of the valve member to effect a change of position of passage 32 from a full drain position, FIG. 15a, to a drain close off position, FIG. 16a. In the illustrated embodiment, angle U is approximately 22°.

FIG. 6 shows a modified form of the improved valve assembly 120 which differs from valve assembly 20 in that an electrical probe unit 200 is carried by the valve member 122. Body member 121 is modified in only one respect, namely, in lieu of the central opening 128 of the first section 123 having the upper end thereof closed off by a solid portion it is provided with an annular, inwardly extending collar 128a and the opening is internally threaded substantially throughout. The valve member 122 is similar in construction to valve member 22 except that the first segment 130 is in the form of an elongated upright tube. The lower portion of the tube, which is connected to the base 131a of the valve member, is encompassed by an O-ring seal 129 and external threads 130a are formed above the seal and mesh with the internal threads of the body member central opening 128.

As seen in FIGS. 7–11, the tubular first segment 130 includes a pair of narrow openings 130b in which are disposed a pair of thin probes 200a, 200b of electrical conductive material. As seen in FIG. 10 the lower end of each probe is offset a small amount and projects downwardly from the underside of the valve member second segment 131. The downwardly projecting ends of the thin probes are provided with sleeve-like tips 201a, 201b which are crimped or soldered onto the probe ends. The tips are of metallic material and are maintained in proper spaced relation by a connector plug 202, see FIGS. 12–14. The plug is provided with a head section 203 which is sized to snugly fit within the space delimited by a depending shield 139, see FIG. 10. As seen in FIG. 13 the upper surface of the plug head 202 is provided with a pair of sockets 204, 205 which are adapted to accommodate the probe tips 201a and 201b, respectively. Depending shield 139 is provided with a pair of opposed recessed portions 139a formed on the interior surface thereof. The recessed portions are adapted to accommodate the corresponding detents 206, 207 formed on opposite sides of the plug head 203, when the latter is pushed upwardly into the space defined by the shield 139. Extending downwardly from the underside of the plug head 203 is a pair of wire leads 208. Each lead is electrically connected to a corresponding socket 204, 205. The leads 208 have exposed ends, not shown, which are connected to a suitable warning device, not shown, which will alert personnel that the vessel needs to be drained.

The upper ends of the thin probes 200a, 200b are exposed within the vessel interior and located a predetermined distance above the bottom wall W of the vessel and the upper ends of the passages 126,127 formed in the body member 121, see FIG. 6. The tubular first segment 130 through which the thin probes extend is formed of a non-conductive material. Thus, the electrical circuit which includes the thin probes and the warning device, not shown, is completed when the exposed upper ends of the thin probes become immersed within the liquid accumulated in the vessel interior, the latter functioning as an electrical conductor.

It is to be noted that with both illustrated embodiments of the valve assembly 20 and 120, the mounting of the assembly in the drain port P of the vessel V is readily accomplished by merely aligning the central opening of the first section of the body member with the drain port and then pushing the assembly upwardly until the lock elements L automatically snap outwardly so as to engage the upper edge of the drain port collar C. Once this occurs the valve assembly cannot be withdrawn from the drain port. The "O" ring seal 24, 124 carried on the exterior of the first section 23, 123 of the body member is in sliding, sealing engagement with the interior surface of collar C, thus preventing any leakage of the accumulated liquid between the collar and the first section. Where, however, the body member is made integral with the vessel bottom wall, the O-ring seal 24, 124 is eliminated.

Once the the valve assembly is in place, drainage of the accumulated liquid through the assembly can be readily controlled by a minimal amount of turning of the valve member relative to the body member. Furthermore, both embodiments of the improved valve assembly include a minimum number of components, are of simple, durable and inexpensive construction and are easily serviced when required.

We claim:

1. A self-venting valve assembly for use in controlling the flow of liquid accumulated within a lower portion of a closed vessel through a drain port formed in a bottom wall of the vessel, said assembly comprising a body member having a first section thereof for disposition in a non-removable relation within the drain port and having a portion extending beyond an interior surface of the vessel bottom wall into the liquid accumulated in the lower portion of the vessel interior and a second section integral with said first section for projecting outwardly from an exterior surface of the vessel bottom wall, said first and second sections being provided with a first passage for air venting the vessel interior, a second passage of greater cross-sectional area than said first passage and being annularly spaced from said first passage and through which the accumulated liquid is adapted to drain, and an opening intermediate the passages and radially spaced therefrom and having one end thereof exposed and facing downwardly from the vessel bottom wall; and a valve member mounted on said body member for limited manual relative adjustment with respect thereto between predetermined selected positions; said valve member being provided with a first segment axially adjustably mounted within the body member opening, a second segment integral with a portion of said first segment and projecting laterally outwardly therefrom, said second segment having a surface thereof subtending in close proximity a surface of the body member second section, said second segment surface being provided with a first passage and a second passage annularly spaced therefrom, the cross-sectional areas of the corresponding first and second passages of said body and valve members being substantially the same, and seal means completely encircling an end of the first passage of said body member and an end of said body member second passage, said seal means being interposed the body and valve members and in continuous sealing engagement with portions of the proximate surfaces of the body member second section and the valve member second segment when said valve member is disposed in any of said predetermined selected positions of adjustment; when said valve member is in a first selected position of adjustment the corresponding first and second passages of said valve and body members are in communication with one another whereby drainage of the accumulated liquid through the second passages occurs; when said valve member is in a second selected position of adjustment, communication between at least the corresponding first passages of said valve and body members is interrupted and no accumulated liquid drains through the corresponding second passages.

2. The valve assembly of claim 1 wherein the valve member is rotatably mounted on the body member and the body member and valve member are provided with complemental stop means which coact with one another to limit the rotary adjustment of said valve member to about 90°.

3. The valve assembly of claim 2 wherein the opening of the body member is located at substantially the axis of rotation of the valve member and is internally threaded for meshing engagement with complemental external threads formed on the valve member first segment.

4. The valve assembly of claim 1 wherein the valve member is rotatably mounted on the body member and the rotary adjustment of the valve member between the first and second selected positions is substantially 45°.

5. The valve assembly of claim 1 wherein the passages formed in the body member are substantially diametrically opposed to one another and the passages in the valve member are in non-diametric relation.

6. The valve assembly of claim 1 wherein the opening formed in the body member has a lower end thereof exposed and an upper end adapted to be exposed to the vessel interior; the valve member having an elongated first segment with a portion thereof protruding upwardly a substantial distance from the upper end of the body member opening; said elongated first segment being provided with sensor means having a first portion adapted to extend into the interior of the closed vessel and determine when the liquid accumulated therein is at a predetermined level.

7. The valve assembly of claim 6 wherein the upwardly protruding portion of the valve member first segment and the sensor means first portion are elevated a substantial distance above corresponding ends of said first and second passages of said body member.

8. The valve assembly of claim 7 wherein the sensor means is provided with an exposed second portion projecting downwardly from the valve member for electrical engagement with a connector.

9. The valve assembly of claim 8 wherein the exposed second portion of the sensor means is disposed within a space defined by a shield depending from the valve member; said space accommodating a portion of the connector.

10. The valve assembly of claim 1 wherein the body member first section is provided with lock elements, the latter being adapted to be in a sealing, snap-fit, locking engagement with an internal collar delimiting the drain port and extending upwardly from the interior surface of the vessel bottom wall whereby said body member is rendered non-removable with respect to the drain port.

11. The valve assembly of claim 1 wherein the first passage of the body member has an upper end elevated relative to an upper end of the second passage of said body member.

* * * * *